2 Sheets—Sheet 1.

J. STEPHENSON.

STREET-CAR PLATFORM.

No. 6,917. Reissued Feb. 8, 1876.

Witnesses:
A. McCallum
D. G. Stuart

Inventor:
John Stephenson
by S. Hannay atty.

N. PETERS, PHOTO-LITHOGRAPHER, WASHINGTON, D. C.

J. STEPHENSON.
STREET-CAR PLATFORM.
No. 6,917. Reissued Feb. 8, 1876.
Fig. 3.
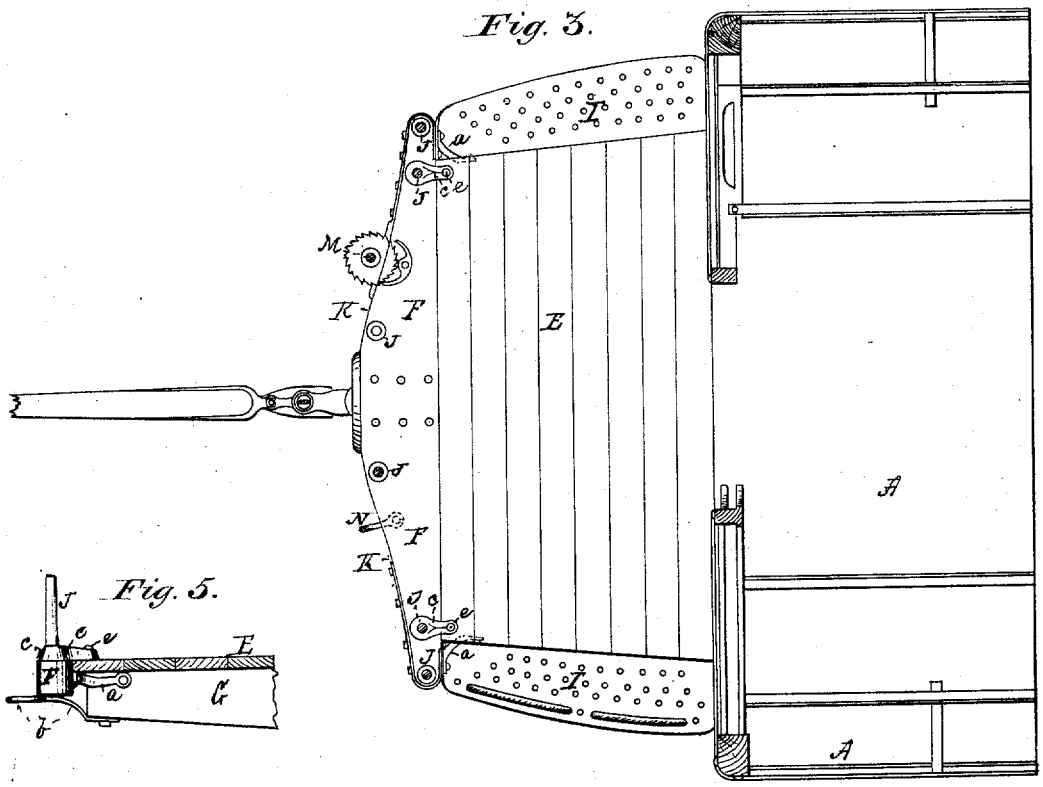
Fig. 5.
Fig. 4.
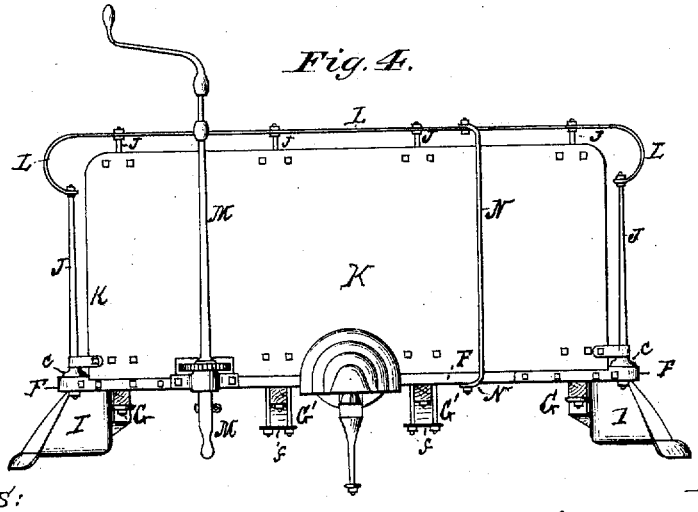
Witnesses:
A. McWallum
D. G. Stuart
Inventor:
John Stephenson
by S. Hannay
Atty.
N. PETERS, PHOTO-LITHOGRAPHER, WASHINGTON, D. C.

UNITED STATES PATENT OFFICE.

JOHN STEPHENSON, OF NEW YORK, N. Y.

IMPROVEMENT IN STREET-CAR PLATFORMS.

Specification forming part of Letters Patent No. 87,120, dated February 23, 1869; reissue No. 6,917, dated February 8, 1876; application filed August 20, 1875.

DIVISION H[1].

*To all whom it may concern:*

Be it known that I, JOHN STEPHENSON, of New York, in the county of New York and State of New York, have invented certain new and useful Improvements in Street-Car Platforms; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
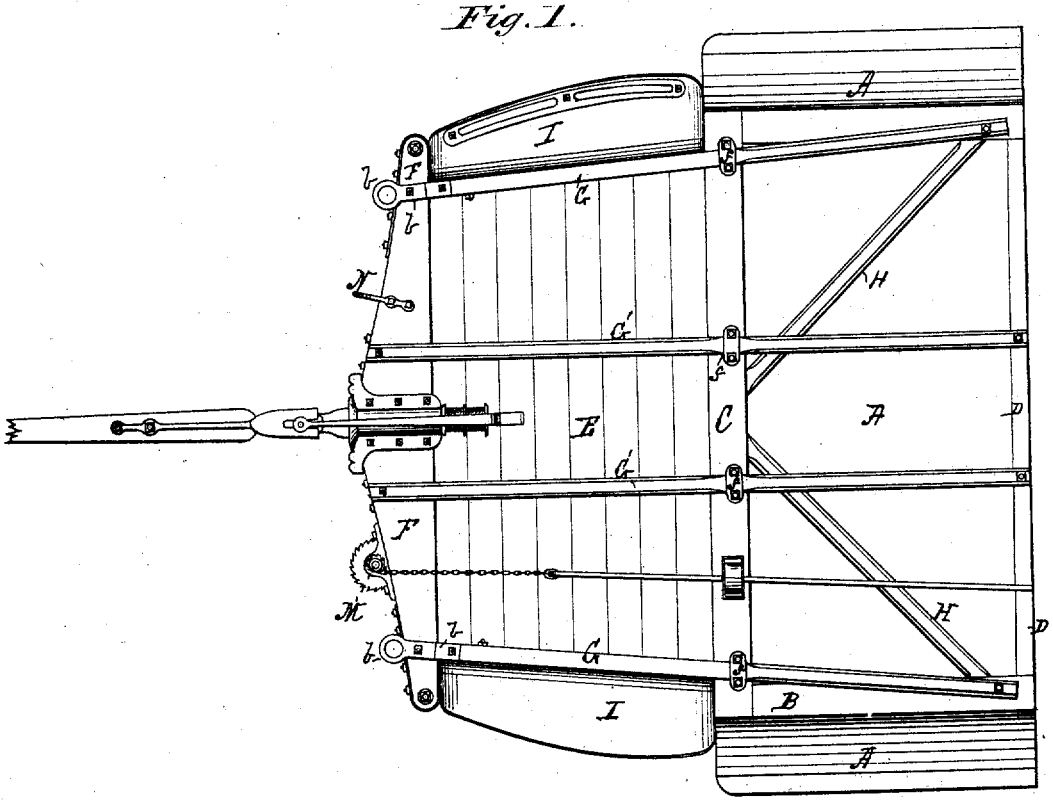
Figure 2:
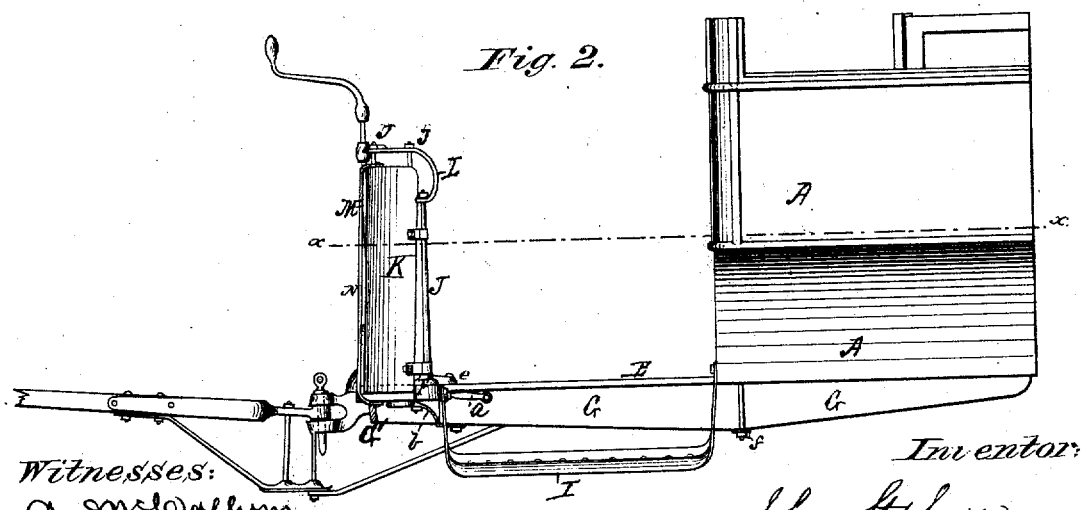

Figure 1 represents a plan of the under side of a portion of the front end of a street-car constructed under or according to my invention. Fig. 2 represents a side view of the same. Fig. 3 represents a horizontal section through the line *x x* of Fig. 2. Fig. 4 represents a front view of the platform and its attachments as detached from the car, and Fig. 5 an enlarged side view of a portion of the improved platform.

This division of my invention relates to the construction of the platforms of street-cars, and has for its objects, first, greater strength and ability to resist the injurious effects of accidents; secondly, greater durability; thirdly, greater relief to the car-body from the strain of the platform; and, fourthly, greater immunity from accidents to passengers and to the vulnerable parts of the car.

The platform of a street-car is its most vulnerable part, and the one most liable to be accidentally damaged.

The tendency of street-railway practice is to enlarge the platforms in order that they may carry a greater number of passengers. Such platforms necessitate the employment of a better construction, and of a stronger and better attachment to the car-body, than has usually obtained or been practiced.

As formerly constructed the supporting-timbers—and which are usually four in number—were centralized sufficiently to bring the outer edge of the car-step within the line of the bottom rail, in order to prevent them from being damaged by contact with passing vehicles. As thus constructed the outside supporting-timbers of the platform were arranged in a line approximately parallel to each other, and were located under the end sill, remote from the sides of the car, and with their inner ends attached to the floor-timbers.

Such construction has several disadvantages—as, for instance, the inner ends of the platform supports or bearers, connecting with the floor-beam at a point remote from the sills, force the floor-beam upward when the platform is heavily loaded, thereby causing it to break at the place of connection, this fracture being promoted by the hole for the connecting-bolt. In other cases the deflection of the end sill of the platform and upbending of the floor-beam cause the outer verge of the car-platform to drop, and thereby force the steps in contact with the roadway. Moreover, this unfavorable connection of the platform bearers or supports with the end sills has a tendency to deflect the sills, disjoint the framework of the body, split the end panels, wrest the end sill from its position, and finally to precipitate the platform with its load of passengers upon the track, all of which not unfrequently happens. This condition of things is much aggravated by the excessive number of passengers frequently carried on the enlarged platforms before referred to, which causes a pressure on the dash-board, forcing it outward, and thereby twisting or turning the nose-timber, into which the feet of the dash-pillars are secured, and which twist is further increased by the strain on the brake-reel, the foot of which extends below the platform, and thus, when the pressure of the brake-chain is exerted upon it, acts as a lever upon the nose to turn or twist it around. While in this condition contact with a passing vehicle would inevitably carry away the nose-piece and dash-board, and precipitate the passengers to the ground.

Another danger is peculiar to this old construction of the platform, it being incident to the indenting of the steps into the platform, which brings them within the external line of the car-bottom, and frequently results in a serious calamity, as, when thus constructed and a passenger slips from the steps, he falls in the line of the wheels, and is thereby subjected to all the evil consequences incident to such a casualty.

My improved construction of the platform and mode of attaching or securing it to the car-body are intended to remedy the evils above referred to.

My improvement consists in arranging the outer bearers of the platform at an angle to each other, they being made to slightly converge toward each other at their outer ends, and diverge at their inner. This divergence I prefer to make sufficiently great that their inner ends may be bolted directly to the side sills of the car at or about their junction with the first inner cross-timber and body-trusses. This gives great stability to the bearers, and largely, if not wholly, relieves the bottom of the car from the upward pressure of the platform when loaded with passengers.

The convergence of the outer ends of the car is made sufficiently great to locate them at such distance from the ends of the nose-timbers as that the latter may receive the forward end of the steps, and the latter be secured thereto on the outer side of the platform-bearers. This arrangement of the outer bearers brings them in favorable contact with the end sill of the car—*i. e.*, near its junction with the sides or angles of the bottom of the car—and therefore in the most favorable position to be secured thereto, as they are there firmly supported by the body-trusses, which renders those portions of the car the very strongest in the body.

This construction of the platform and mode of attaching it to the body relieve the end sill, floor-timbers, panels, and frame-work of the car-body from the strains to which the old modes subject them. It also provides a better location for the steps, and enables them to receive a better form, whereby both they and the car-body are rendered less subject to accident. This immunity to the steps from damage results from the location of their front end within the ends of the nose-piece, and from the backwardly and outwardly flaring construction of their projecting or outer edge, which imparts to the latter a shear-like form, similar to the bow of a vessel, whereby vehicles coming in contact with them are pushed off, and harm to them and the car avoided. This outward flare of the steps toward the wheels also affords greater security to the passenger from accident, inasmuch as a person, in slipping off the step, will fall on the outside of the wheel-line, being pushed out of harm's way.

My improvement also consists in combining, with the dash-pillars, nose-piece, and platform, a stay arm or collar of a length sufficient to extend from the pillar across the nose-piece, and over a portion of the front end of the platform proper, in order to receive a bolt at its farther end, by which to secure it firmly to the platform and its bearer, thereby preventing the nose-piece from turning or twisting by the pressure of the passengers on the dash-board. To further secure and strengthen the connection of the nose-piece to the platform I arrange an anchor, knee-brace, or stay in the angles formed by the nose-piece and bearers, and then respectively bolt them to the bearer and nose-piece.

My improvement further consists in combining with the dash board or apron—which is usually constructed of sheet-iron on that half not protected by the brake-reel rod—a fender or guard consisting of an iron rod, of suitable shape and construction, bolted at its upper end to the dash-rail, and at its lower end to the under side of the nose-timber. This dash-fender is made of a slightly-curved form to increase its stiffness, that it may brace the dasher against outward pressure and be better able to resist damaging blows from the single-trees.

To enable others skilled in the art to make, construct, and use my invention, I will now describe its parts, omitting a particular description of such parts of a car as are non-essential to a full understanding of the improvement.

The body of the car may be built in any known and suitable way. The forward end of a suitably-constructed car is shown in Figs. 1, 2, and 3, in which A indicates the car-body; B, the side sills; C, the end sill, and D the first inner cross-timber, all of which are of the ordinary construction. E indicates the platform, which in this case differs from others in being made somewhat shorter at its front end on the line of the width of the car, so as to bring it within the line of the ends of the nose-piece F, as shown in Figs. 1 and 3. Platform E is supported upon bearers G G and G′ G′. The two outer ones, G G, are made to diverge from each other at their inner ends, and converge toward each other at their forward or outer end, as shown in Fig. 1. This divergence of the inner ends of the outer bearers enables me to securely bolt or fasten them, at their inner end, to that part of the car-body best adapted to withstand the strain exerted upon them by the platform—to wit, the side sill at or near its junction with the body-trusses H and the first inner cross-beam D—and to the end sill C, at or near its junction with the side sills A, and which is effected by clamps *f*, firmly bolted to the sill. The convergence of the bearers G at their forward ends brings them considerably within the outer ends of the nose-piece F, thereby furnishing space to arrange the forward ends of the steps I within the ends also of the nose-piece, to which they are securely bolted. The outer sides of these bearers also serve as a back support to the steps, protecting them against breakage. This arrangement of the forward end of the steps within the ends of the nose-piece protects them from injury by passing vehicles. The forward ends of the outer bearings G G do not extend under the nose-piece, but the corresponding ends of the inner bearers G′ G′ do, thereby supporting it. Nose-piece F is firmly secured or anchored to the forward ends of the outer bearers G G by means of a brace or stay, *a*, arranged at the angles where they come together. Each of these braces is respectively bolted at one end to one of the outer bearers G, and at the other to the inner edge of one of the ends of nose-piece F. Each of these bolts also secures the forward end of one of the steps, the end of said step being interposed between the end of brace *a* and the nose-piece. By these means the nose-piece is firmly anchored to the bearers G. To the under side of the forward end of the outer bearers G G and the under side of the ends of nose-piece F are respectively secured the hook or eye plates *b*, to which the single-trees are attached. These also assist in bracing up the nose-piece to prevent it from turning or twisting. This object, however, is more effectually accomplished by means of a limbed collar or foot, *c*, on the lower end of each of the dash-pillars J, they being arranged on the upper side of the ends of the nose-piece and platform.

The bolting of the dash-pillars to the nose-piece firmly secures one end of this limbed collar to the latter, as the lower end of the pillar passes through or forms part of collar *c*, while screw-bolts *e* as securely fasten their outer ends to the platform, these bolts for this purpose being, respectively, passed through the platform and outer bearers G G, and then secured thereto by a screw-nut on each of their lower ends. This effectually prevents the dash-pillars and nose-piece from turning outward or rolling over in that direction by pressure on the dash-board. The inner bearings G′ G′ are each securely bolted at their inner ends to the first inner cross-beam D, and then rigidly attached to the end sill C by means of clamps *f*, firmly bolted to the end sill C.

The dasher K, as a rule, is constructed of sheet-iron, and is attached to pillars J, the lower ends of which pass through the nose-piece and are firmly secured thereto, two at least of which will be provided with feet or limbed collars *c*, in order to brace them so as to effectually prevent the dash-board from being forced outward under the pressure of the passengers on the platform. The upper ends of these pillars are all connected together by means of a stout curved dash-rail, L. To this rail is attached the upper bearing of the ordinary brake reel or rod M, the lower end of which has its bearing secured to the front edge of the nose-piece. Brake-rod M protects one-half of the dash-board from injury by the single-tree on that side, but leaves the other half unprotected from the other. To obviate liability to damage on that side I arrange a bent or curved guard-rod, N, in front of the other half, about midway between the end of the dasher and its middle. The upper end of guard N is firmly bolted to the dash-rail L, and its lower end to the under side of nose-piece F. The curved form of guard N also serves to brace the dash-board against outward pressure of the passengers.

By reference to Fig. 1 it will be seen that the angular arrangement of the outer bearers G enables me to arrange the steps I, that lead to the platform, so that each of their forward ends will not only fall within the end of the nose-piece, and thus be protected from injury, but within the line of the side sill B of the bottom of the car, while the same construction—supposing the step to be of the same width throughout—throws its rear end beyond the outer line of the bottom or lower sill of the car—in other words, giving to its outer edge an angular direction from front to rear.

This construction enables the step, when brought into contact with the wheels of a passing vehicle, to throw or push it off without being seriously damaged thereby. It also, in the case of a passenger slipping and falling, pushes him beyond the wheel-line, and, consequently, out of danger of being overrun by them. To increase this tendency the step itself is widened toward its rear end, thereby insuring safety to the passengers and to the body of the car, also.

Having described my invention, what I claim as new, and desire to secure by Letters Patent, is—

1. A street-car platform, E, having its front and rear edges parallel, or nearly so, while its sides diverge from front to rear, as and for the purpose set forth.

2. In combination with the platform and body of a street-car, bearers or supports G G, arranged to converge from rear to front, substantially as and for the purpose set forth.

3. The combination of a step, I, with the nose-piece F and platform of a street-car, in which the outer bearers G G of the latter run obliquely to the line of the length of the car, substantially as and for the purposes set forth.

4. A street-car platform in which the ends of its nose-piece are made to project sufficiently far beyond its edges to protect the front end of the steps from accident by passing vehicles, in combination with steps I, having a rearwardly-flaring outer edge, substantially as set forth.

5. Stays *c*, in combination with nose-piece F and platform E, substantially as and for the purposes set forth.

6. Knee braces or stays *a*, in combination with a nose-piece and platform, constructed substantially as and for the purpose set forth.

7. A fender or guard, N, constructed, arranged, and secured substantially as described, in combination with the dash-board K and brake-rod M, for the purpose set forth.

In testimony that I claim the foregoing I have hereunto set my hand this 21st day of July, 1875.

JOHN STEPHENSON.

Witnesses: AUGUST RIPPERGER,
JOHN SMITH.